US012493057B2

(12) United States Patent
McNally et al.

(10) Patent No.: US 12,493,057 B2
(45) Date of Patent: Dec. 9, 2025

(54) CURRENT SENSOR INTEGRATED CIRCUIT

(71) Applicant: Allegro MicroSystems, LLC, Manchester, NH (US)

(72) Inventors: Maxwell McNally, Manchester, NH (US); Alexander Latham, Harvard, MA (US); Shixi Louis Liu, Hooksett, NH (US); William P. Taylor, Amherst, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 192 days.

(21) Appl. No.: 18/512,122

(22) Filed: Nov. 17, 2023

(65) Prior Publication Data

US 2025/0164529 A1    May 22, 2025

(51) Int. Cl.
*G01R 15/20* (2006.01)
*G01R 19/00* (2006.01)

(52) U.S. Cl.
CPC ......... *G01R 15/202* (2013.01); *G01R 15/205* (2013.01); *G01R 19/0092* (2013.01)

(58) Field of Classification Search
CPC .. G01R 15/202; G01R 15/205; G01R 15/207; G01R 19/0092
See application file for complete search history.

(56) References Cited

U.S. PATENT DOCUMENTS

| | | | |
|---|---|---|---|
| 5,210,493 A | 5/1993 | Schroeder et al. | |
| 5,255,157 A | 10/1993 | Hegel | |
| 5,289,344 A | 2/1994 | Gagnon et al. | |
| 5,557,504 A | 9/1996 | Siegel et al. | |
| 5,570,273 A | 10/1996 | Siegel et al. | |
| 5,963,028 A | 10/1999 | Engel et al. | |
| 6,211,462 B1 | 4/2001 | Carter, Jr. et al. | |
| 6,265,865 B1 | 7/2001 | Engel et al. | |
| 6,306,684 B1 | 10/2001 | Richardson et al. | |
| 6,326,243 B1 | 12/2001 | Suzuya et al. | |
| 6,356,068 B1 | 3/2002 | Steiner et al. | |
| 6,781,359 B2 | 8/2004 | Stauth et al. | |
| 6,995,315 B2 | 2/2006 | Sharma et al. | |
| 7,005,754 B2 | 2/2006 | Howarth | |

(Continued)

FOREIGN PATENT DOCUMENTS

| | | |
|---|---|---|
| EP | 3 671 228 A1 | 6/2020 |
| EP | 4 141 451 A1 | 3/2023 |

(Continued)

OTHER PUBLICATIONS

U.S. Appl. No. 18/882,963, filed Sep. 12, 2024, Taylor.

(Continued)

*Primary Examiner* — Dominic E Hawkins
(74) *Attorney, Agent, or Firm* — DALY, CROWLEY, MOFFORD & DURKEE, LLP

(57) ABSTRACT

Methods and apparatus for a current sensor integrated circuit package that includes a die having a first magnetic field sensing element and a leadframe to support the die. The leadframe has a U-shaped current conductor loop with a throat region and a first notch in the throat region of the current conductor loop. A first magnetic field sensing element is positioned in relation to the first notch. In some embodiments, the first magnetic field sensing element is aligned with an edge of the first notch.

30 Claims, 9 Drawing Sheets

(56) References Cited

U.S. PATENT DOCUMENTS

| | | |
|---|---|---|
| 7,075,287 B1 | 7/2006 | Mangtani et al. |
| 7,166,807 B2 | 1/2007 | Gagnon et al. |
| 7,183,485 B2 | 2/2007 | Groothuis et al. |
| 7,259,545 B2 | 8/2007 | Stauth et al. |
| 7,265,531 B2 | 9/2007 | Stauth et al. |
| 7,301,229 B2 | 11/2007 | Yau |
| 7,372,147 B2 | 5/2008 | Dai et al. |
| 7,476,816 B2 | 1/2009 | Doogue et al. |
| 7,518,354 B2 | 4/2009 | Stauth et al. |
| 7,554,180 B2 | 6/2009 | McKerreghan et al. |
| 7,598,601 B2 | 10/2009 | Taylor et al. |
| 7,709,754 B2 | 5/2010 | Doogue et al. |
| 7,746,056 B2 | 6/2010 | Stauth et al. |
| 7,816,905 B2 | 10/2010 | Doogue et al. |
| 7,923,996 B2 | 4/2011 | Doogue et al. |
| 8,080,994 B2 | 12/2011 | Taylor et al. |
| 8,461,677 B2 | 6/2013 | Ararao et al. |
| 8,486,755 B2 | 7/2013 | Ararao et al. |
| 8,542,010 B2 | 9/2013 | Cesaretti et al. |
| 8,604,777 B2 | 12/2013 | Doogue et al. |
| 8,629,539 B2 | 1/2014 | Milano et al. |
| 8,692,546 B2 | 4/2014 | Cesaretti et al. |
| 8,729,892 B2 | 5/2014 | Friedrich |
| 8,907,437 B2 | 12/2014 | Milano et al. |
| 9,190,606 B2 | 11/2015 | Liu et al. |
| 9,222,992 B2 * | 12/2015 | Ausserlechner ... G01R 19/0092 |
| 9,228,860 B2 | 1/2016 | Sharma et al. |
| 9,299,915 B2 | 3/2016 | Milano et al. |
| 9,383,425 B2 | 7/2016 | Milano et al. |
| 9,411,025 B2 | 8/2016 | David et al. |
| 9,494,660 B2 | 11/2016 | David et al. |
| 9,620,705 B2 | 4/2017 | Milano et al. |
| 9,666,788 B2 | 5/2017 | Taylor et al. |
| 9,788,403 B2 | 10/2017 | Mrusek |
| 9,812,588 B2 | 11/2017 | Vig et al. |
| 9,865,807 B2 * | 1/2018 | Liu .................. G01R 33/0052 |
| 10,120,041 B2 | 11/2018 | Haas et al. |
| 10,132,879 B2 | 11/2018 | Latham et al. |
| 10,230,006 B2 | 3/2019 | Vig et al. |
| 10,234,513 B2 | 3/2019 | Vig et al. |
| 10,333,055 B2 | 6/2019 | Milano et al. |
| 10,345,343 B2 | 7/2019 | Milano et al. |
| 10,352,969 B2 | 7/2019 | Milano et al. |
| 10,509,058 B2 | 12/2019 | Cadugan et al. |
| 10,578,684 B2 * | 3/2020 | Cadugan ............ G01R 33/0094 |
| 10,607,925 B2 | 3/2020 | David et al. |
| 10,718,794 B2 | 7/2020 | El Bacha et al. |
| 10,725,100 B2 | 7/2020 | Milano et al. |
| 10,753,963 B2 * | 8/2020 | Milano .................. G01R 15/20 |
| 10,916,665 B2 | 2/2021 | Vig et al. |
| 10,935,612 B2 | 3/2021 | Belin et al. |
| 11,024,576 B1 | 6/2021 | West et al. |
| 11,085,952 B2 | 8/2021 | Cadugan et al. |
| 11,183,436 B2 | 11/2021 | Liu et al. |
| 11,289,406 B2 | 3/2022 | Briano et al. |
| 11,444,209 B2 | 9/2022 | Vig et al. |
| 11,519,946 B1 | 12/2022 | Rock et al. |
| 11,768,229 B2 | 9/2023 | Boden et al. |
| 11,768,230 B1 | 9/2023 | Liu et al. |
| 12,306,217 B2 | 5/2025 | Houis |
| 2002/0190703 A1 | 12/2002 | Goto et al. |
| 2003/0193018 A1 | 10/2003 | Tao et al. |
| 2004/0124505 A1 | 7/2004 | Mahle et al. |
| 2005/0030018 A1 | 2/2005 | Shibahara et al. |
| 2005/0124185 A1 | 6/2005 | Cromwell et al. |
| 2007/0126092 A1 | 6/2007 | San Antonio et al. |
| 2007/0279053 A1 | 12/2007 | Taylor et al. |
| 2010/0156394 A1 | 6/2010 | Ausserlechner et al. |
| 2011/0049685 A1 | 3/2011 | Park et al. |
| 2011/0234215 A1 | 9/2011 | Ausserlechner |
| 2011/0248711 A1 | 10/2011 | Ausserlechner |
| 2012/0089266 A1 | 4/2012 | Tomimbang et al. |
| 2013/0138372 A1 | 5/2013 | Ausserlechner |
| 2014/0253103 A1 | 9/2014 | Racz et al. |
| 2015/0108967 A1 | 4/2015 | Barczyk |
| 2015/0270198 A1 | 9/2015 | Cuoco et al. |
| 2015/0285874 A1 | 10/2015 | Taylor et al. |
| 2016/0187388 A1 | 6/2016 | Suzuki et al. |
| 2016/0216296 A1 | 7/2016 | Nakayama et al. |
| 2016/0223594 A1 | 8/2016 | Suzuki et al. |
| 2016/0313375 A1 * | 10/2016 | Etschmaier .......... G01R 15/202 |
| 2017/0179067 A1 | 6/2017 | Aoki et al. |
| 2018/0166350 A1 * | 6/2018 | Racz .................. H01L 21/4842 |
| 2018/0306843 A1 | 10/2018 | Bussing et al. |
| 2019/0006266 A1 | 1/2019 | Gomez et al. |
| 2019/0049527 A1 | 2/2019 | Vig et al. |
| 2019/0154737 A1 | 5/2019 | Nobira |
| 2019/0204363 A1 | 7/2019 | Suzuki et al. |
| 2019/0369144 A1 | 12/2019 | Mauder et al. |
| 2020/0033384 A1 | 1/2020 | Kishi et al. |
| 2020/0064382 A1 * | 2/2020 | Takata .................. G01R 19/15 |
| 2020/0191835 A1 | 6/2020 | Bilbao de Mendizabal et al. |
| 2021/0243911 A1 | 8/2021 | Tang et al. |
| 2021/0263077 A1 | 8/2021 | Hirano et al. |
| 2021/0397015 A1 | 12/2021 | Moon |
| 2022/0018880 A1 | 1/2022 | Houis |
| 2022/0026469 A1 * | 1/2022 | Schmitt ............... G01R 33/096 |
| 2023/0058695 A1 | 2/2023 | Boden et al. |
| 2023/0060219 A1 | 3/2023 | Liu et al. |
| 2023/0221355 A1 | 7/2023 | Liu |
| 2024/0047314 A1 | 2/2024 | Briano et al. |

FOREIGN PATENT DOCUMENTS

| | | |
|---|---|---|
| FR | 3 090 121 | 6/2020 |
| FR | 3 090 121 54 | 6/2020 |

OTHER PUBLICATIONS

U.S. Appl. No. 18/672,430, filed May 23, 2024, Wang et al.

U.S. Appl. No. 18/447,665, filed Aug. 10, 2023, Kasparek.

U.S. Appl. No. 18/450,494, filed Aug. 16, 2023, Hein et al.

U.S. Appl. No. 17/817,796, filed Aug. 5, 2022, Briano, et al.

European Examination Report dated Aug. 28, 2023 for European Application No. 22183450.0; 4 pages.

Response to European Examination Report dated Aug. 28, 2023 for European Application No. 22183450.0 as filed on Oct. 30, 2023; 18 pages.

European Extended Search Report (EESR) dated Dec. 22, 2022 for European Application No. 22183450.0; 7 pages.

Response to Official Communication dated Mar. 6, 2023 and to EESR dated Dec. 22, 2022 for European Application No. 22183450.0; Response filed on Jun. 14, 2023; 24 pages.

PCT International Search Report and Written Opinion dated Apr. 25, 2023 for International Application No. PCT/US2022/051968; 16 pages.

Preliminary Amendment filed on Jan. 12, 2022 for U.S. Appl. No. 17/409,011; 6 pages.

Notice of Allowance dated Aug. 23, 2022 for U.S. Appl. No. 17/409,011; 10 pages.

U.S. 1$^{st}$ Non-Final Office Action dated Mar. 15, 2023 for U.S. Appl. No. 17/654,254; 19 pages.

Response to U.S. 1$^{st}$ Non-Final Office Action dated Mar. 15, 2023 for U.S. Appl. No. 17/654,254; Response filed on Mar. 22, 2023; 10 pages.

U.S. 2$^{nd}$ Non-Final Office Action dated May 19, 2023 for U.S. Appl. No. 17/654,254; 15 pages.

Response to U.S. 2$^{nd}$ Non-Final Office Action dated May 19, 2023 for U.S. Appl. No. 17/654,254; Response filed on May 25, 2023; 9 pages.

U.S. Notice of Allowance dated Aug. 9, 2023 for U.S. Appl. No. 17/654,254; 5 pages.

Bush, "DNP Claims World's Thinnest Chip Package;" Retrieved from: https://www.electronicsweekly.com/news/products/micros/dnp-claims-worlds-thinnest-chip-package-2009-03/; Mar. 24, 2009; 2 Pages.

European Examination Report dated Apr. 24, 2025 for European Application No. 22183450.0; 4 Pages.

(56) References Cited

OTHER PUBLICATIONS

Communication Pursuant to Article 94(3) EPC dated Apr. 24, 2025, for European Application No. 22183450.0; 4 pages.
U.S. Appl. No. 18/624,271, filed Apr. 2, 2024, Wang et al.
Allegro MicroSystems, LLC, "Thermal Design for Plastic Integrated Circuits;" Package Information document; Mar. 3, 2016; 4 Pages.
Beeker, "PCB Design Techniques to Improved ESD Robustness;" AMF-DES-T2360; PowerPoint Presentation; Oct. 2016; 72 Pages.
Chen, "The Intricacies of Lead Frames in the Semiconductor Industry;" Article Published Sep. 2, 2023; 12 Pages.
Sauber et al., "Guidelines for Designing Subassemblies Using Hall-Effect Devices;" Allegro MicroSystems, LLC Product Information Data Sheet AN277031, Rev. 19; May 4, 2021; 10 Pages.

* cited by examiner

CURRENT SENSOR INTEGRATED CIRCUIT

BACKGROUND

As is known in the art, conventional magnetic field current sensors sense current in a current-carrying conductor via a magnetic field generated by the current through the conductor. The current sensor generates an output signal having a magnitude proportional to the magnetic field induced by the current through the conductor.

SUMMARY

Example embodiments of the disclosure provide method and apparatus for a current sensor having a leadframe with at least one notch in a throat of the sensor and at least one magnetic field sensing element for concentrating magnetic field in the sensing area to increase signal on the magnetic field sensing element(s). The notches decrease the feature size in this area of the current loop for increasing the frequency at which skin effects occur. The smaller feature size provided by the notches reduces the total charge movement even when skin effects do occur. In embodiments, first and second magnetic field sensing elements positioned in relation to the respective notches enable differential sensing of the magnetic field.

In one aspect, a current sensor integrated circuit package comprises: a die having a first magnetic field sensing element; a leadframe to support the die, the leadframe having a U-shaped current conductor loop with a throat region and a first notch in the throat region of the current conductor loop; and a first magnetic field sensing element positioned in relation to the first notch.

A package can further include one or more of the following features: a second magnetic field sensing element and a second notch in the leadframe, the first magnetic field sensing element is aligned with an edge of the first notch, the first magnetic field sensing element comprises a Hall effect element, the first magnetic field sensing element comprises an MR element, the first magnetic field sensing element comprises a TMR element, a second notch in the throat region of the current conductor loop, the U-shaped current conductor loop comprises a U-shape with a bottom between first and second legs, wherein the first notch is formed in the first leg facing the throat region and the second notch is formed in the second leg facing the throat region, a first outer notch in the first leg, wherein the first notch and the first outer notch are on opposite sides of the first leg, and further including a second outer notch in the second leg, wherein the second notch and the second outer notch are on opposite sides of the second leg, the first notch and the first outer notch are symmetrical in shape, the first notch and the first outer notch are symmetrical with respect to an axis, a distance from a bottom of the first notch to a bottom of the first outer notch is a minimum width of the leadframe in the throat region, a width of the first notch is at least two times a thickness of the leadframe, the width of the first notch is less than four times a thickness of the leadframe, a distance from the bottom of the U to a beginning of the first notch is at least two times a thickness of the leadframe, the first magnetic field sensing element straddles an edge of the first notch and further including a second magnetic field sensing element that straddles an edge of the second notch, and/or the first magnetic field sensing element comprises MR sensing elements located over the leadframe.

In another aspect, a method comprises: employing a die having a first magnetic field sensing element in a current sensor integrated circuit package; supporting a leadframe with the die, the leadframe having a U-shaped current conductor loop with a throat region and a first notch in the throat region of the current conductor loop; and positioning a first magnetic field sensing element in relation to the first notch.

A method can further include one or more of the following features: a second magnetic field sensing element and a second notch in the leadframe, the first magnetic field sensing element is aligned with an edge of the first notch, the first magnetic field sensing element comprises a Hall effect element, the first magnetic field sensing element comprises an MR element, the first magnetic field sensing element comprises a TMR element, a second notch in the throat region of the current conductor loop, the U-shaped current conductor loop comprises a U-shape with a bottom between first and second legs, wherein the first notch is formed in the first leg facing the throat region and the second notch is formed in the second leg facing the throat region, a first outer notch in the first leg, wherein the first notch and the first outer notch are on opposite sides of the first leg, and further including a second outer notch in the second leg, wherein the second notch and the second outer notch are on opposite sides of the second leg, the first notch and the first outer notch are symmetrical in shape, the first notch and the first outer notch are symmetrical with respect to an axis, a distance from a bottom of the first notch to a bottom of the first outer notch is a minimum width of the leadframe in the throat region, a width of the first notch is at least two times a thickness of the leadframe, the width of the first notch is less than four times a thickness of the leadframe, a distance from the bottom of the U to a beginning of the first notch is at least two times a thickness of the leadframe, the first magnetic field sensing element straddles an edge of the first notch and further including a second magnetic field sensing element that straddles an edge of the second notch, and/or the first magnetic field sensing element comprises MR sensing elements located over the leadframe.

BRIEF DESCRIPTION OF DRAWINGS

The foregoing features of this disclosure, as well as the disclosure itself, may be more fully understood from the following description of the drawings in which.

DETAILED DESCRIPTION

Figure 1:
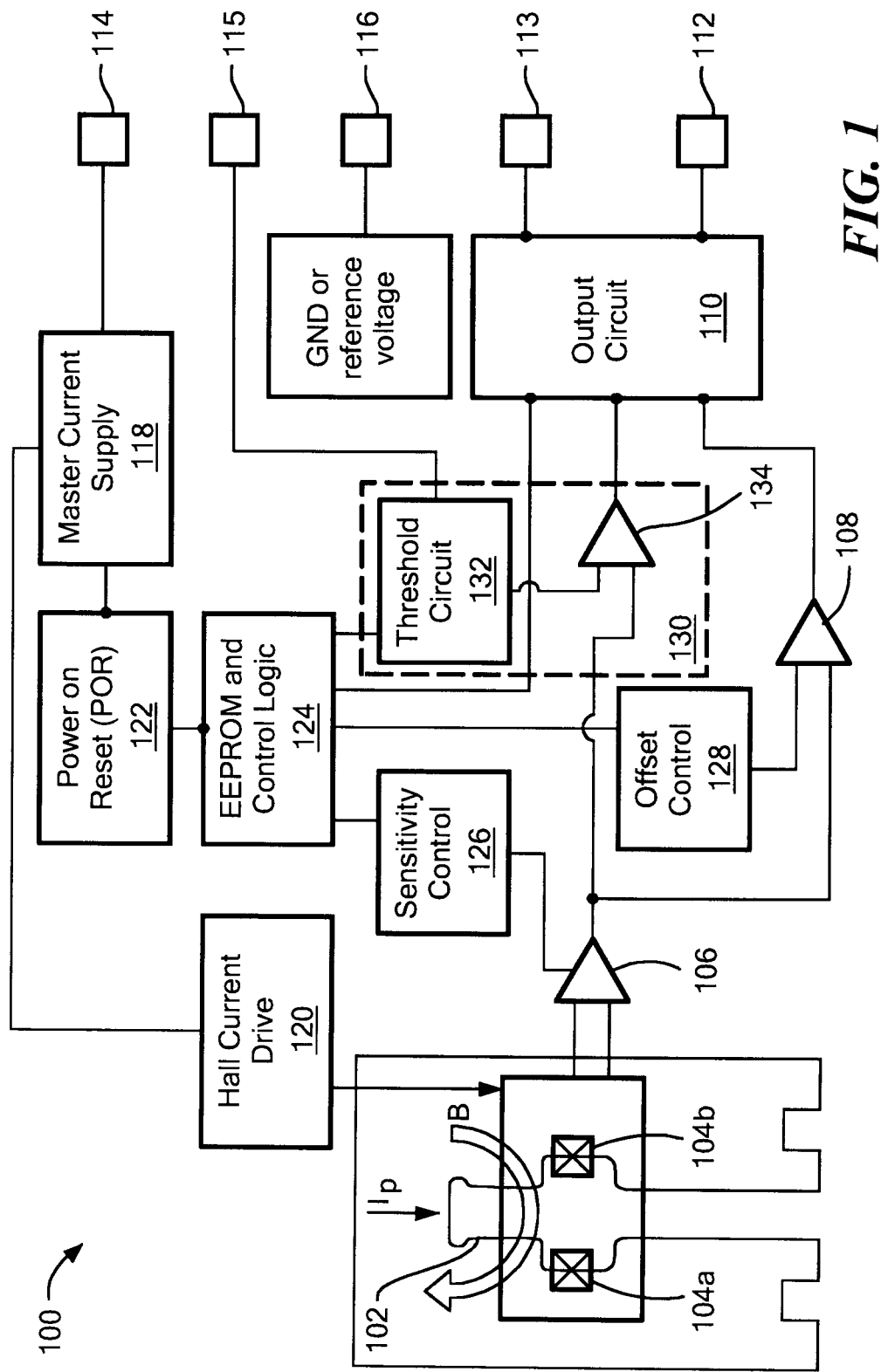
FIG. 1 is a schematic representation of an example current sensor having a notched leadframe in accordance with example embodiments of the disclosure.

FIG. 1 shows an example circuit block diagram for a current sensor integrated circuit 100 having leadframe with a notched current conductor loop in accordance with example embodiments of the disclosure. A current Ip flows through a current conductor loop 102 and generates a magnetic field that can be sensed by first and second magnetic field sensing elements 104a,b, such as Hall effect plates for example. The magnetic field results in the Hall effect plates 104a,b providing a signal to a front-end amplifier 106. The front-end amplifier 106 provides an output to amplifier 108, which may be a linear amplifier, which feeds into an output circuit 110. Output circuit 110 may be a digital or analog circuit that provides an output to at least one bond pad 112. The output represents the magnetic field measured and amplified through the amplifier 108. Other numbers of output bond pads more than two may also be provided.

Bond pad 114 provides a voltage and current input, typically Vcc, to provide power to the integrated circuit 100. A ground bond pad 116 may be provided to integrated circuit 100. Input bond pad 114 is coupled to a master current supply circuit 118 that provides power to the circuitry within integrated circuit 100. Although master current supply 118 is provided as a current supply, it would be apparent that voltages may also be provided to the circuits on integrated circuit 100. A Hall effect current drive circuit 120 takes current (or voltage) from the master current supply 118 and provides a regulated current to the Hall Effect sensing elements 104a,b. The master current supply 118 also provides power to a power on reset circuit 122. The power on reset circuit monitors the power coming into the circuit 100 and provides a signal to EEPROM and control logic circuit 124. The power on reset circuit 122 and EEPROM and control logic circuit 124 are used to configure and enable the integrated circuit, including the output circuit 110.

The EEPROM and control circuit 124 provides a signal to a sensitivity control circuit 126 which provides a signal to the front end amplifier 106 to adjust the sensitivity of the front end amplifier. The adjustment may be the result of a change in the power level in the circuit 100, or as a result of a temperature change of the circuit. An example of a temperature sensor circuit may include but is not limited to a diode temperature sensor, or the use of known temperature compensation resistors.

The EEPROM and control circuit 124 provides a signal to an offset control circuit 128. The offset control circuit 128 provides a signal to the amplifier 108. The offset control circuit 128 allows the circuit 100 to adjust the offset of the amplifier 108 for changes in power or temperature (the temperature compensation circuit is not shown) or a combination of temperature and power changes. The offset control circuit 128 may also provide adjustment for other offset sources, such as a stress in the integrated circuit die.

An input lead 115 may be provided to set a threshold for a fault indication circuit 130 (i.e., provide a fault trip level). In an embodiment, the input lead 115 provides a fault voltage level. The fault indication circuit 130 can include a threshold circuit 132 and a fault comparator 134. The EEPROM and control circuit 124 provides an input to the threshold circuit 132. The threshold circuit 132 provides a signal to the fault comparator 134, which compares the output of threshold circuit 132 with the output of the front end amplifier 106 to indicate when a fault exists to the output circuit block 110. The output circuit generates a fault output at output bond pad 113. The fault output may indicate an overcurrent condition in which the current sensed in the current conductor path exceeds a fault trip level, which trip level may be provided in the form of a fault voltage level on bond pad 115. The fault allows, in one example, the user of the current sensor package to turn off the current in the primary current path in order to prevent a high current condition in an electrical circuit.

It is understood that any of the above-described processing may be implemented in hardware, firmware, software, or a combination thereof. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

Figure 2A:
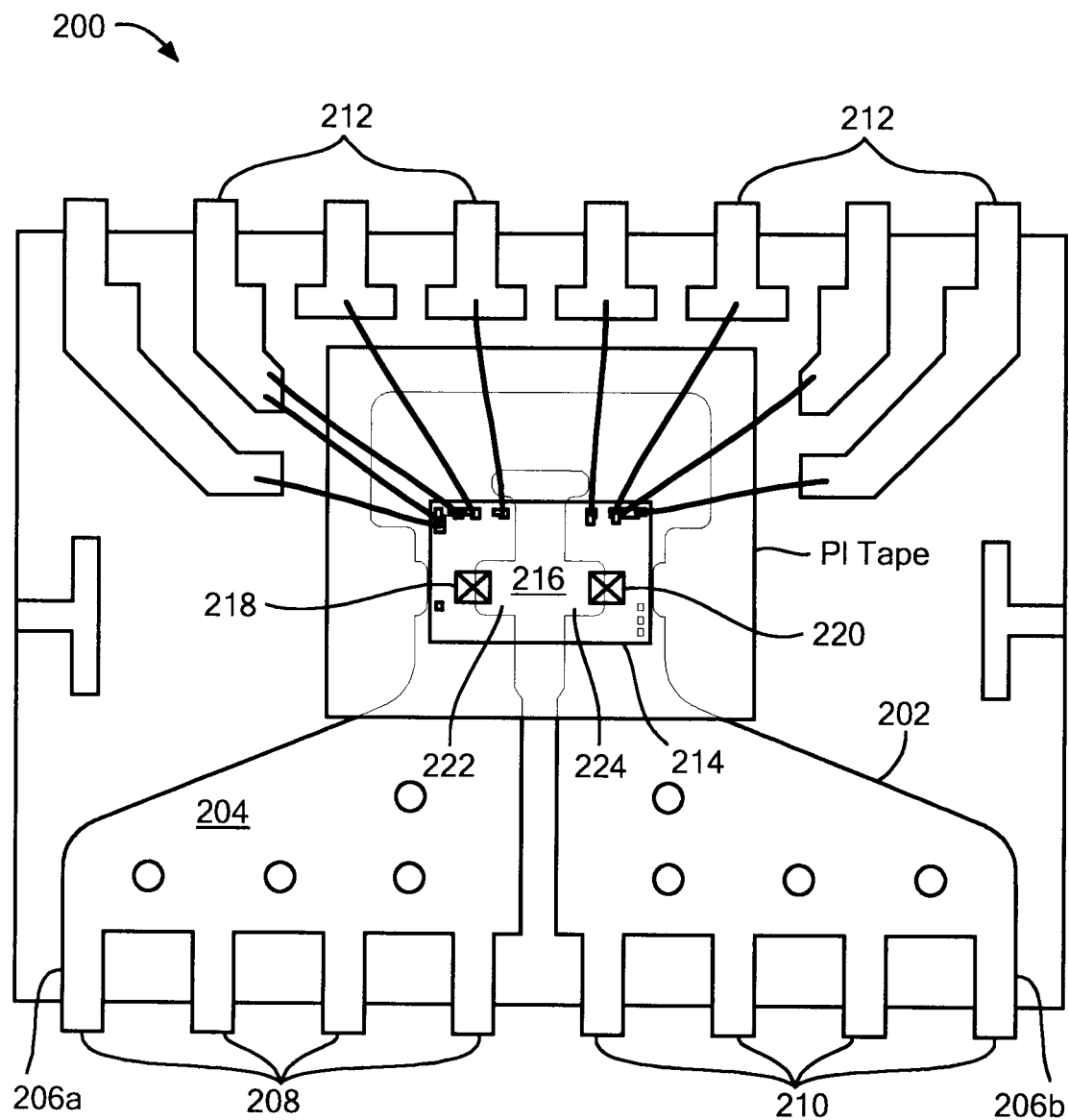
FIG. 2A is a partially transparent top view of a current sensor having a notched leadframe in accordance with example embodiments of the disclosure.
Figure 2B:
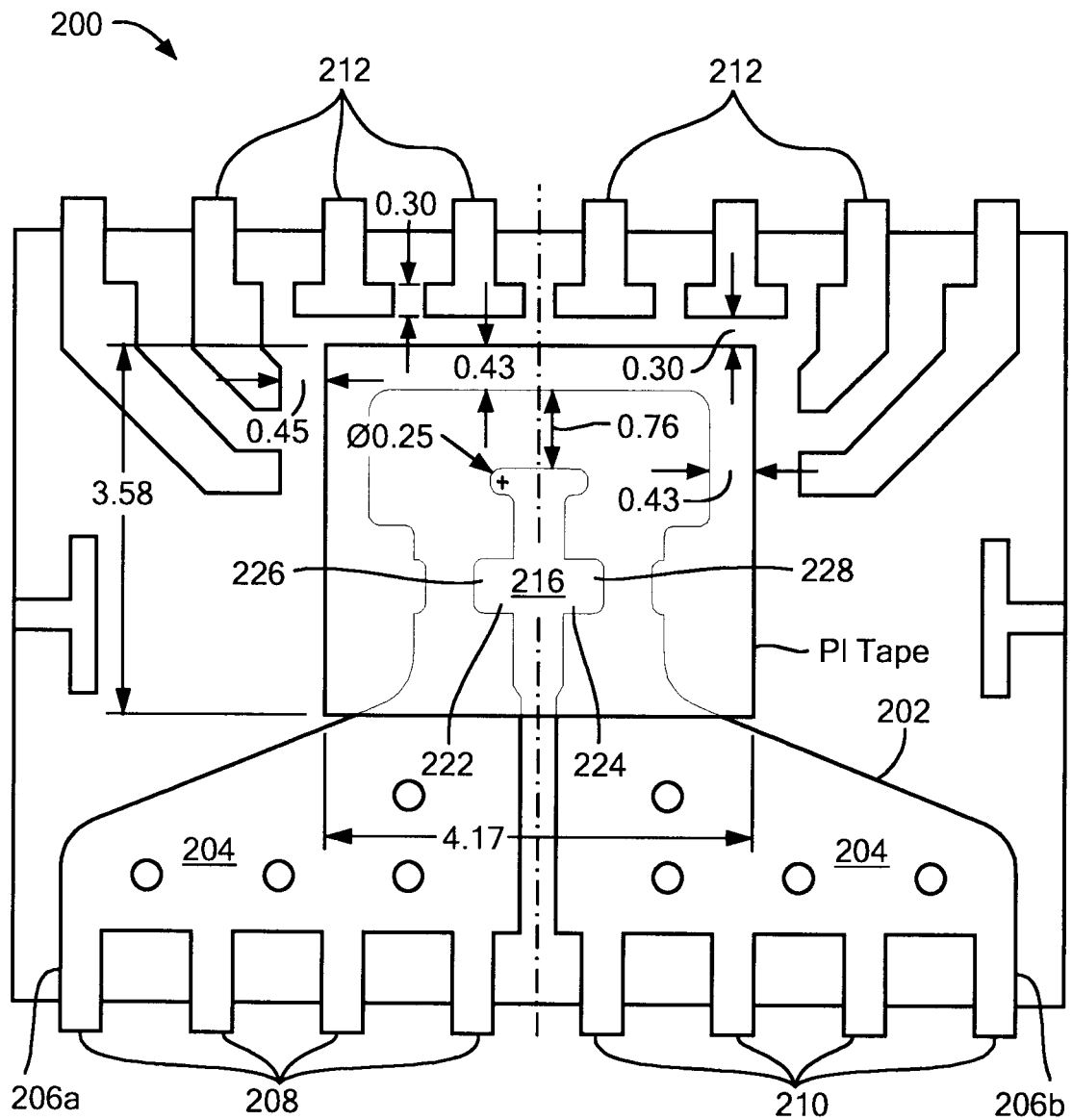
FIG. 2B shows the current sensor of FIG. 2A without a die.
Figure 2C:
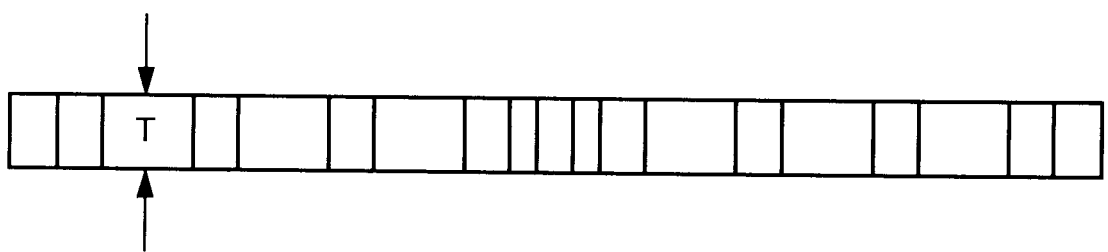
FIG. 2C shows a side view of the IC of FIG. 2B with the leadframe having a thickness T.

FIGS. 2A and 2B shows a packaged current sensor integrated circuit (IC) 200 including a leadframe 202 with a current conductor loop 204 having first and second ends 206a,b through which current flows in either direction. In the illustrated embodiment, one side of the leadframe 202 has a first series of terminals 208 electrically coupled to the first end 206a of the leadframe and a second series of terminals 210 coupled to the second end 206b. The other side of the leadframe 202 has a number of terminals 212 that can be connected to a die 214, such as via wirebonds. FIG. 2B shows the IC 200 without the die 214. FIG. 2C shows a side view of the IC 200 of FIG. 2B with the leadframe having a thickness T. In embodiments, polyimide (PI) tape can provide electrical isolation.

The current conductor loop 204, which has a generally U-shape, includes a throat region 216 about which current flows to change direction from into the throat to out of the throat. In the illustrated embodiment, the die 214 includes a first magnetic field sensing element 218 and a second magnetic field sensing element 220. The first magnetic field sending element 218 is positioned in relation to a first notch 222 in the throat region 216 of the leadframe and the second magnetic field sensing element 220 is positioned in relation to a second notch 224 in the throat region 216. In the illustrated embodiment (see FIGS. 2A and 2B), the first magnetic field sensing element 218 is aligned with a bottom 226 of the first notch 222 and the second magnetic field sensing element 220 is aligned with a bottom 228 of the second notch 224. In the illustrated embodiment, the first and second field sensing elements 218, 220 straddle respective edges of the notch bottoms 226, 228. As used here, the term straddle means that at least a portion of the respective magnetic field sensing element overlaps with a respective conductive edge of the notch.

Figure 3:
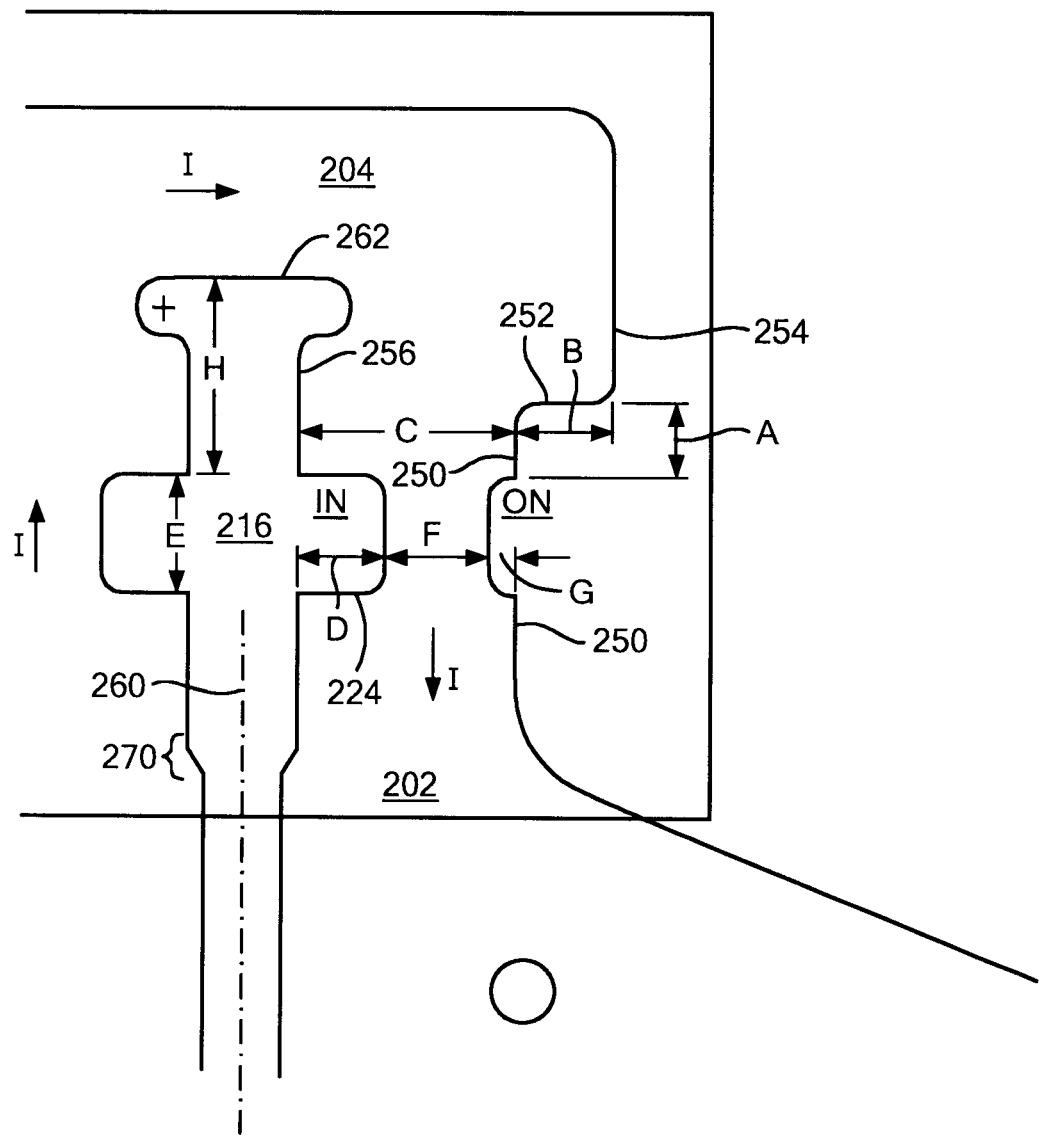
FIG. 3 shows a portion of the sensor of FIG. 2B in additional detail.

FIG. 3 shows more detail of the second notch 224 in the leadframe 202. This area of the leadframe can be referred to as a busbar through which current to be measured flows. In general, the direction of current should follow the U-shape, e.g., flow in a generally linear direction into the U-shape, change direction at the turn in the U-shape, and flow in a generally linear direction out of the U-shape. The direction of the current in relation to the position of the magnetic field sensing elements can be controlled by a geometry of the notches and throat region to meet the needs of a particular application. For example, the type of magnetic field sensing element may be a factor in positioning the magnetic field sensing elements in relation to the notch geometry and edge locations.

In the illustrated embodiment, the second notch 224 region of FIG. 2 is shown in more detail. The second notch 224 can be considered an inner notch IN which may be sized in relation to an optional outer notch ON, which may be indented from surface 250 and displaced a distance A from surface 252. A distance B corresponds to the spacing of surface 250 and surface 254 of the leadframe. A distance C extends from a non-notched surface 256 in the region of the throat 216 to surface 250. A depth of the inner notch IN is defined by distance D extending from surface 256. A distance F extends from respective bottoms of the inner notch IN and outer notch ON. Distance F is the thinnest part of the leadframe 202 in the throat 216. A depth of the outer notch ON is defined by distance G extending from surface 250. A thickness T of the leadframe is shown in FIG. 2C.

It is understood that the width, depth, geometries, and ratios to lengths and widths of the notch and leadframe can vary to meet the needs of a particular application and achieve desired sensor performance characteristics.

In example embodiments of the sensor, a distance E (width) of the first notch IN is at least twice a distance D (depth) of the first notch to avoid current crowding in this narrowest part of the leadframe. In example embodiments, the distance E ranges from two to fourth times the distance D of the first notch.

In example embodiments, the distance E is at least two times the thickness T of the leadframe. It is understood that 8 mil and 12 mil are common leadframe thicknesses, however, any suitable leadframe thickness can be used to meet the needs of a particular application. In embodiments, distance E is between 2 and 3.5 times leadframe thickness T.

In embodiments, it may be desirable to space the notch IN from the bottom of the U where the current I changes direction so that the direction of current flow is generally parallel to an axis 260 of the throat 216 when passing by the sensing elements. In the illustrated embodiment, the notches IN, ON are spaced by distance A from surface 252. A distance H defines a distance from a bottom 262 of the U-shaped to the beginning of the inner notch IN. In embodiments, distance A enables selection of a distance from a beginning of the notch indentation to a narrowest part of the leadframe at distance F. In example embodiments, distance A is within a range of 60% to 80% of the distance F. It can be seen that distance C=D+F+G.

Figure 4A:
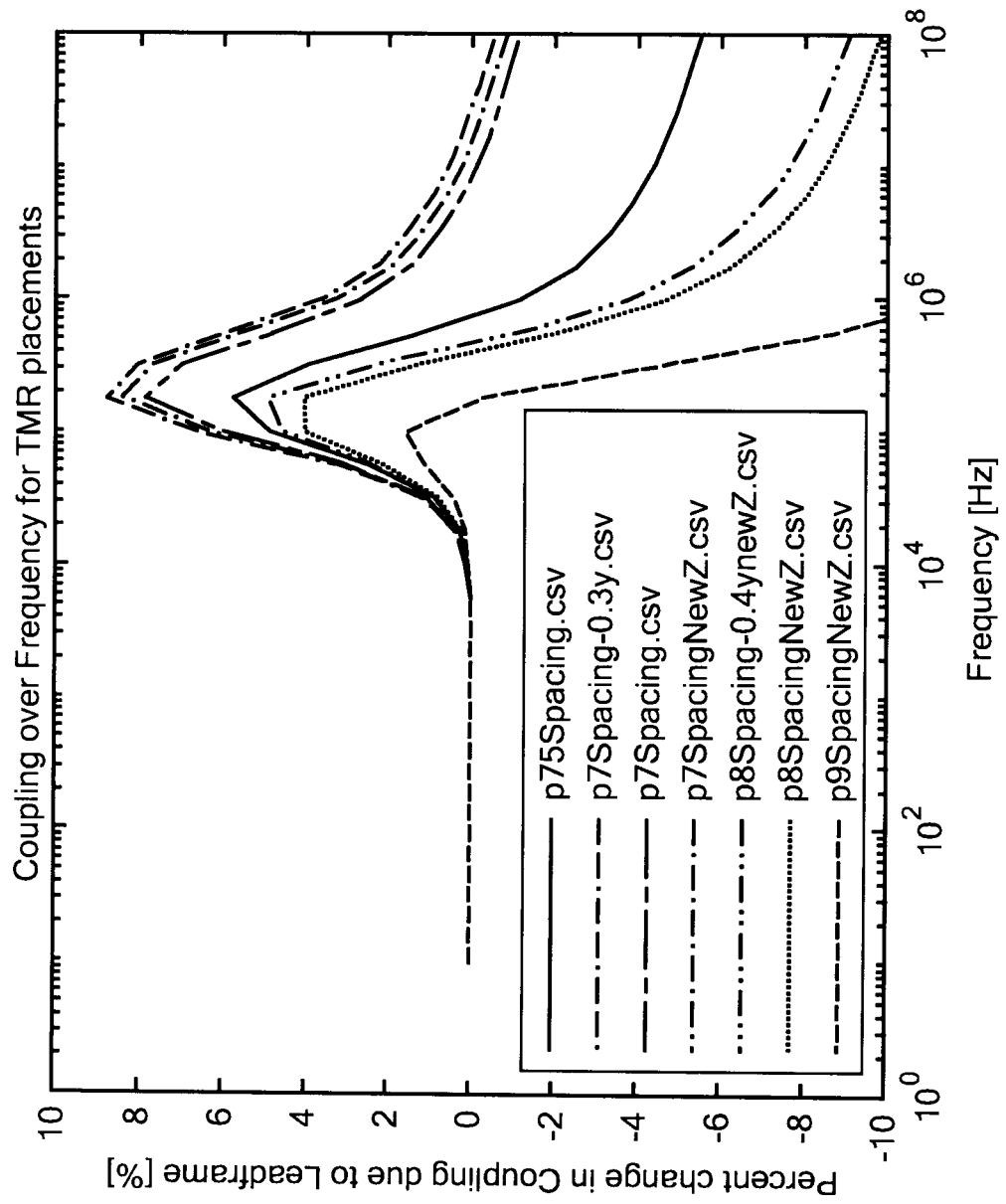
FIG. 4A is a graphical representation of percent change in coupling due to leadframe for a conventional sensor having a TMR magnetic field sensing element.
Figure 4B:
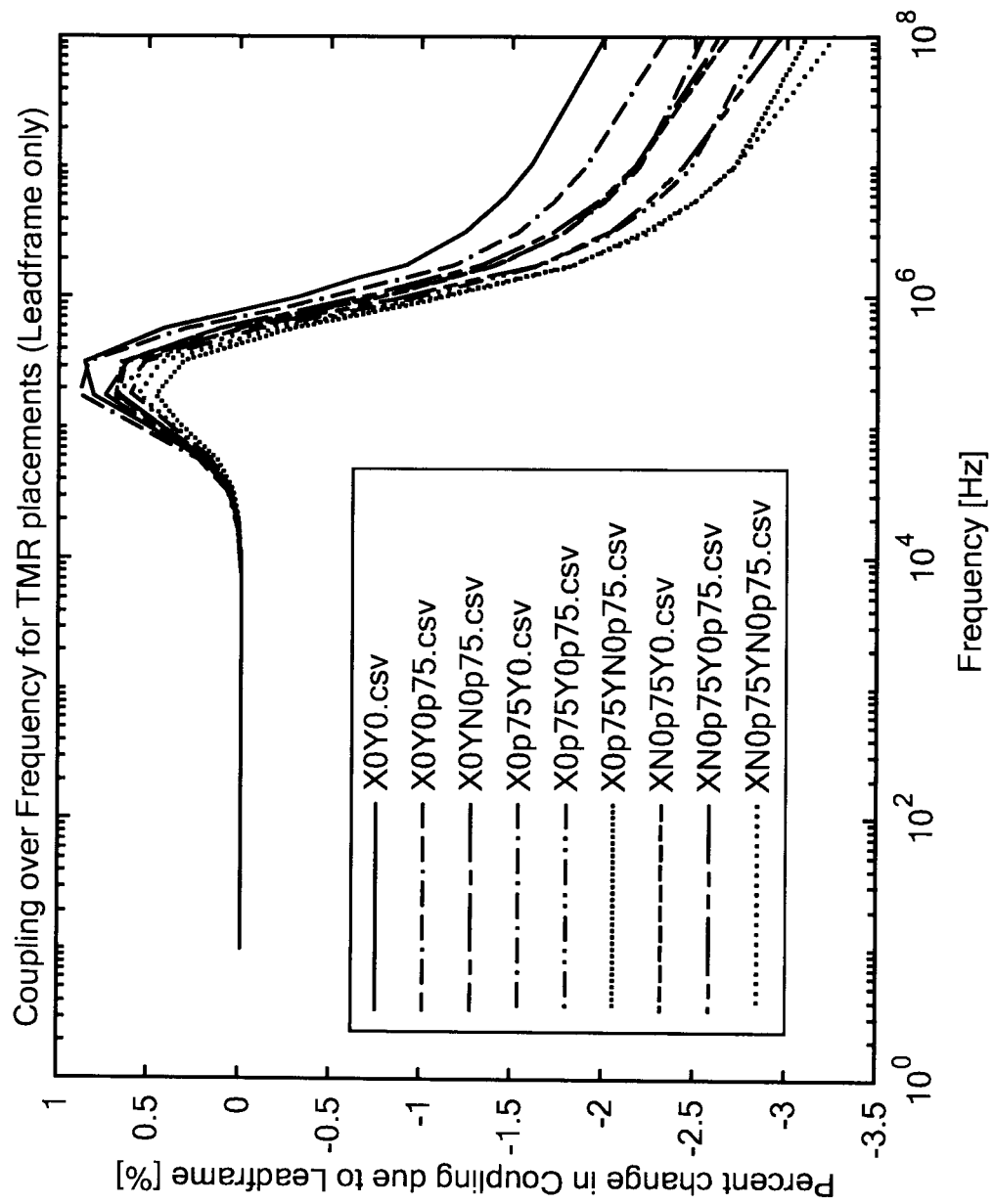
FIG. 4B is a graphical representation percent change in coupling due to leadframe for a sensor having a TMR magnetic field sensing element and notched leadframe in accordance with example embodiments of the disclosure.

In embodiments, the notches are formed to achieve sensor performance characteristics (see, e.g., FIGS. 4A, 4B). In the illustrated embodiment, the inner notch IN has a distance E that is larger than distance F. In example embodiments, distance E is in a range of two to three times distance F.

In the illustrated embodiment, the leadframe includes a taper region 270 in which the distance between the U-portions of the leadframe increases in distance approaching the throat region 216.

Figure 3A:
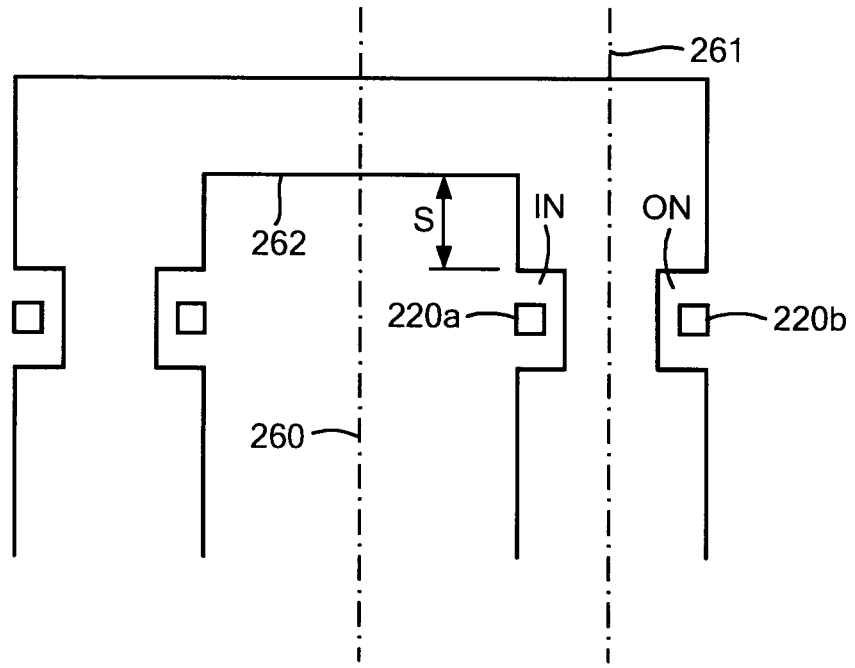
FIG. 3A shows a portion of a sensor having a U-shaped notched leadframe and sensing elements.

FIG. 3A shows a sensor having inner and outer notches IN,ON that are symmetrical in width and depth with pairs of magnetic field sensing elements 220a,220b also located symmetrically with respect to each other and with respect to an axis 261 parallel to the axis of 260 the throat. The magnetic field sensing elements 220 can be spaced a distance S from a bottom 262 of the U-shaped current conductor. In example embodiments, the distance S is between two and three times leadframe thickness and two and three times a width of the notch. It is understood that any suitable number and type of magnetic field sensing element in a variety of locations to meet the needs of a particular application, such as to maximize flux capture.

Figure 3B:
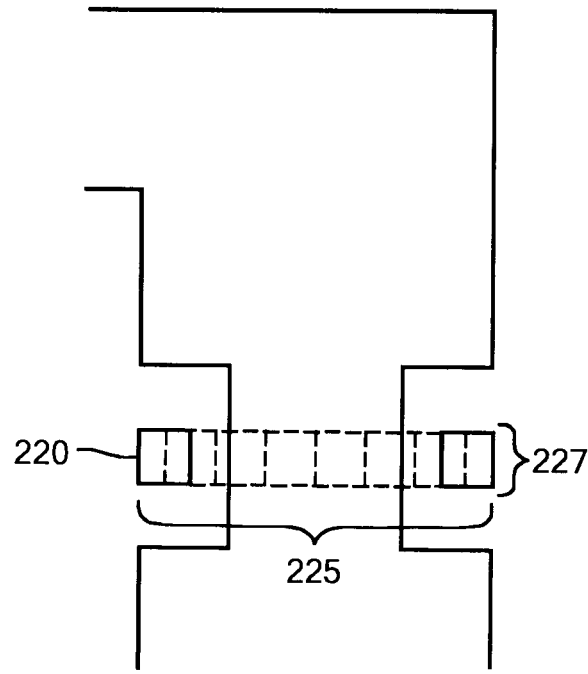
FIG. 3B shows a portion of a sensor having a U-shaped notched leadframe with a range of locations for the sensing elements.

As shown in FIG. 3B, a magnetic field sensing element 220 can be located at any suitable location along a first span 225, which is shown as horizontal on the page, and along a second span 227, which is shown as vertical. The magnetic field 220 can be located based on a variety of factors including current vector characteristics, expect current levels, notch geometry, frequency, type of sensing element, and the like. For example, magnetoresistive (MR) sensing elements may not overlap with an edge of the notches and be centered over conductive leadframe material.

In conventional notchless sensors, high speed current sensing with an integrated leadframe poses challenges for signal magnitude and signal flatness over a wide band of input frequency. Skin effects move charge within the leadframe which can change the coupling to the magnetic sensing element, and the SNR/sensitive direction of the transducer can require strange shapes of the conductor to concentrate field on the element.

In example embodiments, a current sensor includes a looped leadframe with sections necked down to concentrate magnetic field in the sensing area of the throat to increase signal on the sensing elements. Smaller feature sizes in this area increase the frequency at which skin effects occur and reduce the total charge movement even when skin effects do occur. A pair of sensing elements in the current loop allows differential sensing. In some embodiments, half etching of the leadframe where the notches are located can improve performance. In some embodiments, the leadframe can be laminated to reduce eddy effects.

FIG. 4A shows percent change in coupling due to leadframe for a conventional sensor having a TMR magnetic field sensing element and FIG. 4B shows percent change in coupling due to leadframe for a sensor having a TMR magnetic field sensing element and notched leadframe. As can be seen, in example sensor embodiments notches and magnetic field sensing element positions combine to present a relatively flat magnetic field over frequency in the sensitive direction of the TMR. As can be seen, without the notches the magnetic field on the TMR elements changes dramatically at 1 MHz input current as the charge moves away from the center of the leadframe and towards the edges. This peaking goes up to +8% depending on the placement of the TMR, and down to −10%. With the notches, this peaking reduces considerably to within +1%.

Figure 5A:
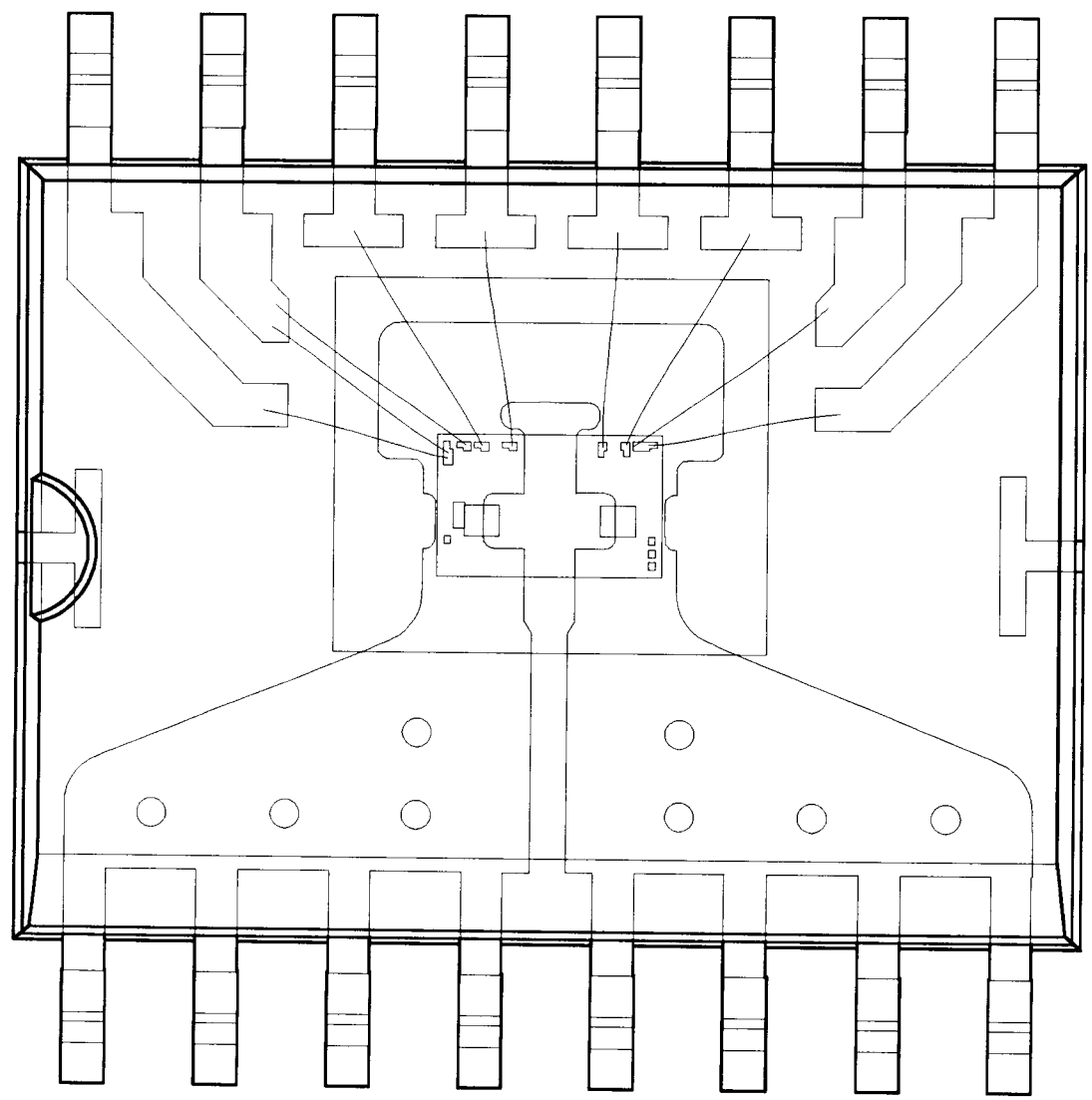
FIG. 5A is a partially transparent top view.
Figure 5B:
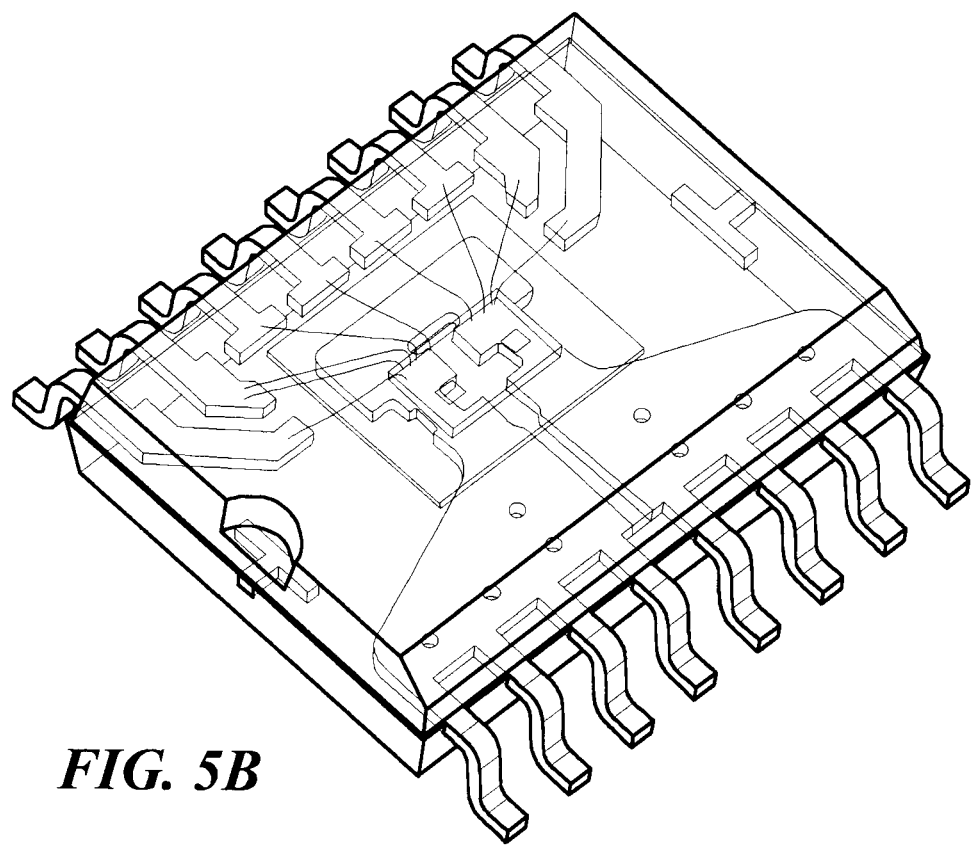
FIG. 5B is a partially transparent isometric view.
Figure 5C:
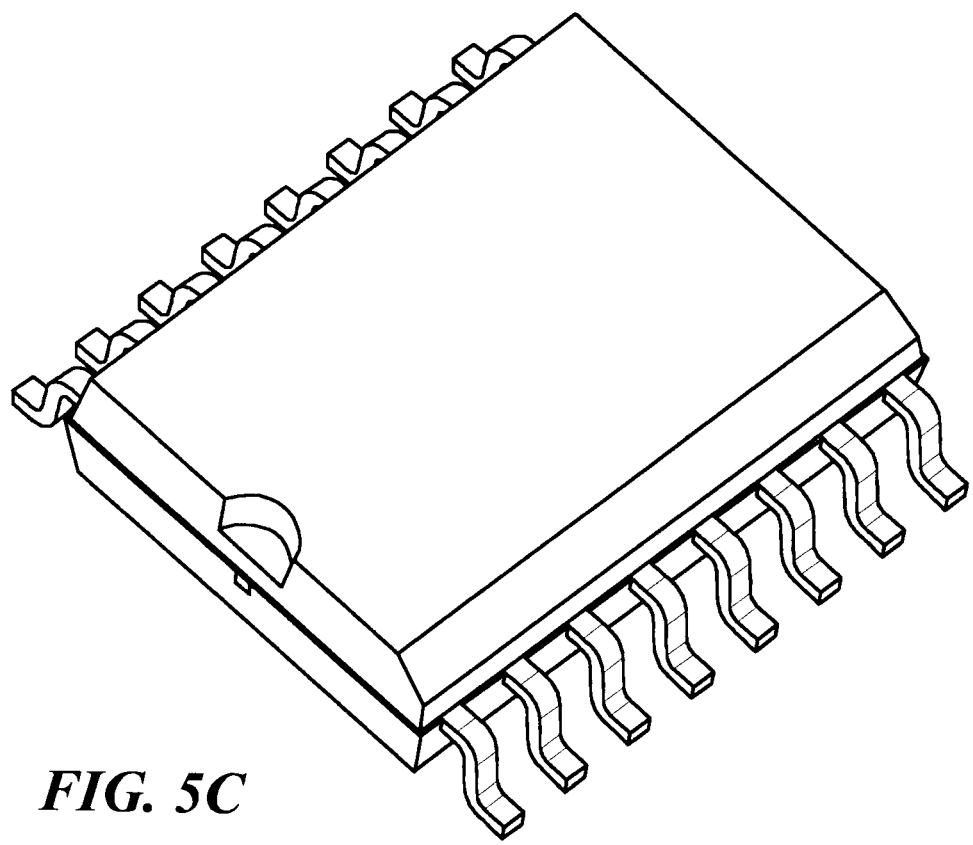
FIG. 5C is an isometric view of an example current sensor IC package having a notched leadframe in a throat of a current sensing loop in accordance with example embodiments of the disclosure.

FIG. 5A is a partially transparent top view, FIG. 5B is a partially transparent isometric view, and FIG. 5C is an isometric view of an example current sensor IC package having a notched leadframe in a throat of a current sensing loop.

As used herein, the term "magnetic field sensing element" is used to describe a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall effect element, a vertical Hall effect element, and a Circular Vertical Hall (CVH) element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half-bridge or full (Wheatstone) bridge, configured for single-ended or differential sensing. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb). A coil may also be used to sense magnetic fields, which may be referred to as inductive sensing. Using a coil to sense a magnetic field is more typical as the frequency of the magnetic field to be sensed increases.

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall effect elements tend to have axes of sensitivity perpendicular to a substrate, while metal based or metallic magnetoresistance elements (e.g., GMR, TMR, AMR) and vertical Hall effect elements tend to have axes of sensitivity parallel to a substrate.

As used herein, the term "magnetic field sensor" is used to describe a circuit that uses a magnetic field sensing element, generally in combination with other circuits. Magnetic field sensors are used in a variety of applications, including, but not limited to, an angle sensor that senses an angle of a direction of a magnetic field, a current sensor that senses a magnetic field generated by a current carried by a current-carrying conductor, a magnetic switch that senses the proximity of a ferromagnetic object, a rotation detector that senses passing ferromagnetic articles, for example, magnetic domains of a ring magnet or a ferromagnetic target (e.g., gear teeth) where the magnetic field sensor is used in combination with a back-biased or other magnet, and a magnetic field sensor that senses a magnetic field density of a magnetic field.

It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of elements can refer to either a direct or an indirect coupling, and a positional relationship between entities can be a direct or indirect positional relationship. As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s). Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, that includes a list of elements is not necessarily limited to only those elements but can include other elements not expressly listed or inherent to such apparatus, method, composition, mixture, or article.

The terms "one or more" and "at least one" indicate any integer number greater than or equal to one, i.e., one, two, three, four, etc. The term "plurality" indicates any integer number greater than one. The term "connection" can include an indirect "connection" and a direct "connection".

References in the specification to "embodiments," "one embodiment," "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

What is claimed is:

1. A current sensor integrated circuit package comprising:
  a die having a first magnetic field sensing element;
  a leadframe to support the die, the leadframe having a U-shaped current conductor loop with a throat region and a first notch in the throat region of the current conductor loop, wherein the first magnetic field sensing element is positioned in relation to the first notch; and
  a second notch in the throat region of the current conductor loop, wherein the U-shaped current conductor loop comprises a U-shape with a bottom between first and second legs, wherein the first notch is formed in the first leg facing the throat region and the second notch is formed in the second leg facing the throat region.

2. The package according to claim 1, further including a second magnetic field sensing element.

3. The package according to claim 1, wherein the first magnetic field sensing element is aligned with an edge of the first notch.

4. The package according to claim 3, wherein the first magnetic field sensing element comprises a Hall effect element.

5. The package according to claim 1, wherein the first magnetic field sensing element comprises an MR element.

6. The package according to claim 5, wherein the first magnetic field sensing element comprises a TMR element.

7. The package according to claim 1, further including a first outer notch in the first leg, wherein the first notch and the first outer notch are on opposite sides of the first leg, and further including a second outer notch in the second leg, wherein the second notch and the second outer notch are on opposite sides of the second leg.

8. The package according to claim 7, wherein the first notch and the first outer notch are symmetrical in shape.

9. The package according to claim 7, wherein the first notch and the first outer notch are symmetrical with respect to an axis.

10. The package according to claim 7, wherein a distance from a bottom of the first notch to a bottom of the first outer notch is a minimum width of the leadframe in the throat region.

11. The package according to claim 10, wherein a width of the first notch is at least two times a thickness of the leadframe.

12. The package according to claim 11, wherein the width of the first notch is less than four times a thickness of the leadframe.

13. The package according to claim 7, wherein a distance from the bottom of the U to a beginning of the first notch is at least two times a thickness of the leadframe.

14. The package according to claim 7, wherein the first magnetic field sensing element straddles an edge of the first notch and further including a second magnetic field sensing element that straddles an edge of the second notch.

15. The package according to claim 7, wherein the first magnetic field sensing element comprises MR sensing elements located over the leadframe.

16. A method, comprising:
employing a die having a first magnetic field sensing element in a current sensor integrated circuit package;
supporting a leadframe with the die, the leadframe having a U-shaped current conductor loop with a throat region and a first notch in the throat region of the current conductor loop; and
positioning the first magnetic field sensing element in relation to the first notch,
wherein the leadframe further includes second notch in the throat region of the current conductor loop, and
wherein the U-shaped current conductor loop comprises a U-shape with a bottom between first and second legs, wherein the first notch is formed in the first leg facing the throat region and the second notch is formed in the second leg facing the throat region.

17. The method according to claim 16, further including providing a second magnetic field sensing element.

18. The method according to claim 16, wherein the first magnetic field sensing element is aligned with an edge of the first notch.

19. The method according to claim 18, wherein the first magnetic field sensing element comprises a Hall effect element.

20. The method according to claim 16, wherein the first magnetic field sensing element comprises an MR element.

21. The method according to claim 20, wherein the first magnetic field sensing element comprises a TMR element.

22. The method according to claim 16, further including a first outer notch in the first leg, wherein the first notch and the first outer notch are on opposite sides of the first leg, and further including a second outer notch in the second leg, wherein the second notch and the second outer notch are on opposite sides of the second leg.

23. The method according to claim 22, wherein the first notch and the first outer notch are symmetrical in shape.

24. The method according to claim 22, wherein the first notch and the first outer notch are symmetrical with respect to an axis.

25. The method according to claim 24, wherein a width of the first notch is at least two times a thickness of the leadframe.

26. The method according to claim 25, wherein the width of the first notch is less than four times a thickness of the leadframe.

27. The method according to claim 22, wherein a distance from a bottom of the first notch to a bottom of the first outer notch is a minimum width of the leadframe in the throat region.

28. The method according to claim 22, wherein a distance from the bottom of the U to a beginning of the first notch is at least two times a thickness of the leadframe.

29. The method according to claim 22, wherein the first magnetic field sensing element straddles an edge of the first notch and further including a second magnetic field sensing element that straddles an edge of the second notch.

30. The method according to claim 22, wherein the first magnetic field sensing element comprises MR sensing elements located over the leadframe.

* * * * *